United States Patent
Sy et al.

(10) Patent No.: US 11,536,808 B2
(45) Date of Patent: Dec. 27, 2022

(54) LIGHT DETECTION AND RANGING SYSTEM AND METHOD

(71) Applicant: ZF ACTIVE SAFETY AND ELECTRONICS US LLC, Livonia, MI (US)

(72) Inventors: Williamson S. Sy, Oak Park, MI (US); Aaron M. Jefferson, Clarkston, MI (US); Neil Das, Farmington Hills, MI (US); Enervon Filipinas, Novi, MI (US)

(73) Assignee: ZF ACTIVE SAFETY AND ELECTRONICS US LLC, Livonia, MI (US)

( * ) Notice: Subject to any disclaimer, the term of this patent is extended or adjusted under 35 U.S.C. 154(b) by 480 days.

(21) Appl. No.: 16/706,963

(22) Filed: Dec. 9, 2019

(65) Prior Publication Data

US 2020/0182981 A1    Jun. 11, 2020

Related U.S. Application Data

(60) Provisional application No. 62/777,268, filed on Dec. 10, 2018.

(51) Int. Cl.
*G01S 7/481* (2006.01)
*G02B 26/10* (2006.01)

(52) U.S. Cl.
CPC .......... *G01S 7/4817* (2013.01); *G02B 26/10* (2013.01)

(58) Field of Classification Search
CPC ..... G01S 7/4815; G01S 7/4817; G02B 26/10; G02B 26/101; G02B 26/106
See application file for complete search history.

(56) References Cited

U.S. PATENT DOCUMENTS

| | | | |
|---|---|---|---|
| 10,732,281 B2 * | 8/2020 | LaChapelle | G01S 7/497 |
| 2019/0129009 A1 * | 5/2019 | Eichenholz | G01S 17/931 |
| 2020/0182979 A1 * | 6/2020 | Wang | G01S 7/4817 |

* cited by examiner

*Primary Examiner* — Sophia S Chen
(74) *Attorney, Agent, or Firm* — Tarolli, Sundheim, Covell & Tummino LLP

(57) ABSTRACT

A light detection and ranging system includes at least one laser that emits a laser beam. A beam steering device steers beams emitted by the laser at a desired angle. A curved mirror reflects the steered beams at any desired angle or direction. A method of providing a light detection and ranging system is also provided.

23 Claims, 2 Drawing Sheets

LIGHT DETECTION AND RANGING SYSTEM AND METHOD

RELATED APPLICATION

This application claims priority from U.S. Provisional Application No. 62/777,268, filed 10 Dec. 2018, the subject matter of which is incorporated herein by reference in its entirety.

TECHNICAL FIELD

This disclosure relates to an apparatus and method for use of a light detection and ranging system and, more particularly, to a method and apparatus for light detection and ranging including a mirror of a predetermined configuration.

BACKGROUND

A known light detection and ranging ("lidar") system for a vehicle may have a laser that emits laser pulses. A movable mirror deflects the laser pulses in the direction of objects. The objects reflect the laser pulse to a detector to detect the objects. A time of flight measurement of the laser pulses is used to measure the distance to the detected objects. The lidar system may be used to detect objects surrounding a vehicle. The lidar system can aid a driver in the operation of a motor vehicle by providing operational information. Data from the lidar system may be provided to other vehicle systems to provide the vehicle operator with a warning, haptic or tactile feedback, and/or autonomous control of the vehicle.

SUMMARY

In an aspect, a light detection and ranging system includes at least one laser that emits a laser beam. A beam steering device steers beams emitted by the laser at a desired angle. A curved mirror reflects the steered beams at any desired angle or direction.

In an aspect, a light detection and ranging system includes at least one laser configured to selectively emit a laser beam. A beam steering device is provided for steering the emitted laser beam at a selected one of a plurality of available angles. A curved mirror reflects the steered laser beam at a predetermined trajectory responsive to the steered angle of the laser beam. A laser beam detector is configured to detect a return signal corresponding to an interaction between an ambient object and the reflected laser beam. A signal processor is provided for receiving the return signal and responsively producing a lidar signal containing information about the ambient object.

In an aspect, a method of providing a light detection and ranging system is provided. A system including at least one laser, a beam steering device, and a curved mirror is provided. A laser beam is emitted from the at least one laser. With the beam steering device, the emitted laser beam is steered at a selected one of a plurality of available angles. The steered laser beam is reflected from the curved mirror at a predetermined trajectory responsive to the steered angle of the laser beam. A return signal corresponding to an interaction between an ambient object and the reflected laser beam is detected. The return signal is received and a lidar signal containing information about the ambient object is responsively produced.

BRIEF DESCRIPTION OF THE DRAWINGS

For a better understanding, reference may be made to the accompanying drawings, in which.

DESCRIPTION OF ASPECTS OF THE DISCLOSURE

Unless defined otherwise, all technical and scientific terms used herein have the same meaning as is commonly understood by one of skill in the art to which the present disclosure pertains.

As used herein, the singular forms "a," "an" and "the" can include the plural forms as well, unless the context clearly indicates otherwise. It will be further understood that the terms "comprises" and/or "comprising," as used herein, can specify the presence of stated features, steps, operations, elements, and/or components, but do not preclude the presence or addition of one or more other features, steps, operations, elements, components, and/or groups thereof.

As used herein, the term "and/or" can include any and all combinations of one or more of the associated listed items.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms can encompass different orientations of a device in use or operation, in addition to the orientation depicted in the figures. For example, if a device in the figures is inverted, elements described as "under" or "beneath" other elements or features would then be oriented "over" the other elements or features.

As used herein, the phrase "at least one of X and Y" can be interpreted to include X, Y, or a combination of X and Y. For example, if an element is described as having at least one of X and Y, the element may, at a particular time, include X, Y, or a combination of X and Y, the selection of which could vary from time to time. In contrast, the phrase "at least one of X" can be interpreted to include one or more Xs.

It will be understood that, although the terms "first," "second," etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or steps) is not limited to the order presented in the claims or figures unless specifically indicated otherwise.

The invention comprises, consists of, or consists essentially of the following features, in any combination.

Figure 1:
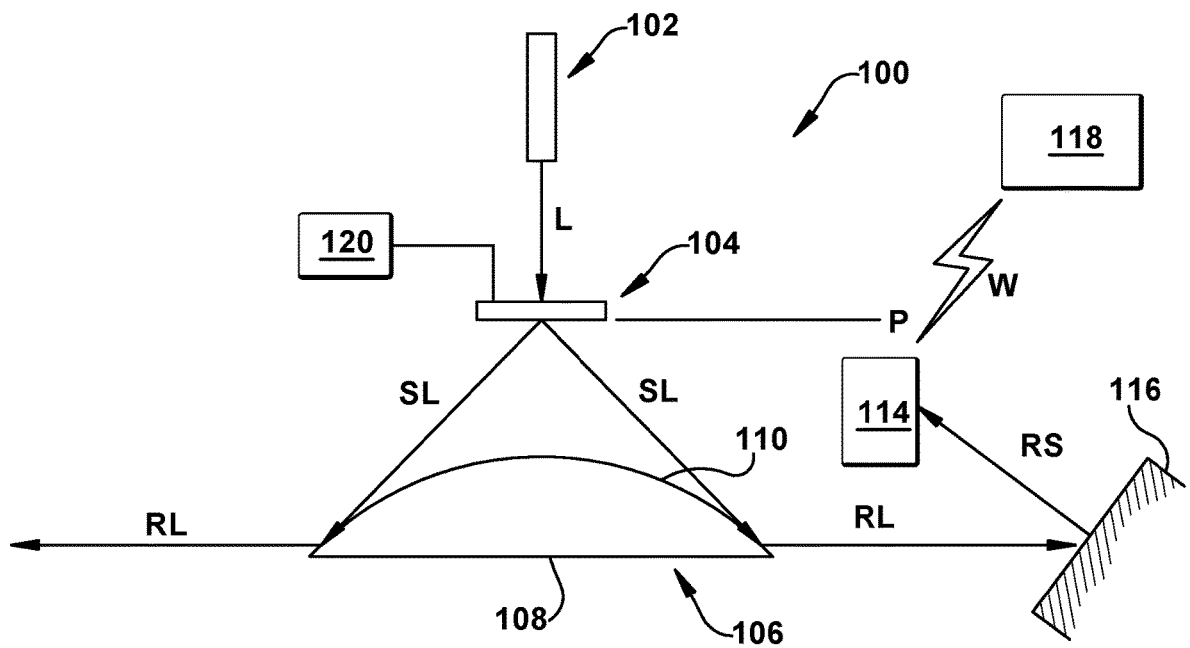
FIG. 1 is a schematic illustration of a lidar system constructed in accordance with an example embodiment of the present invention.
Figure 2:
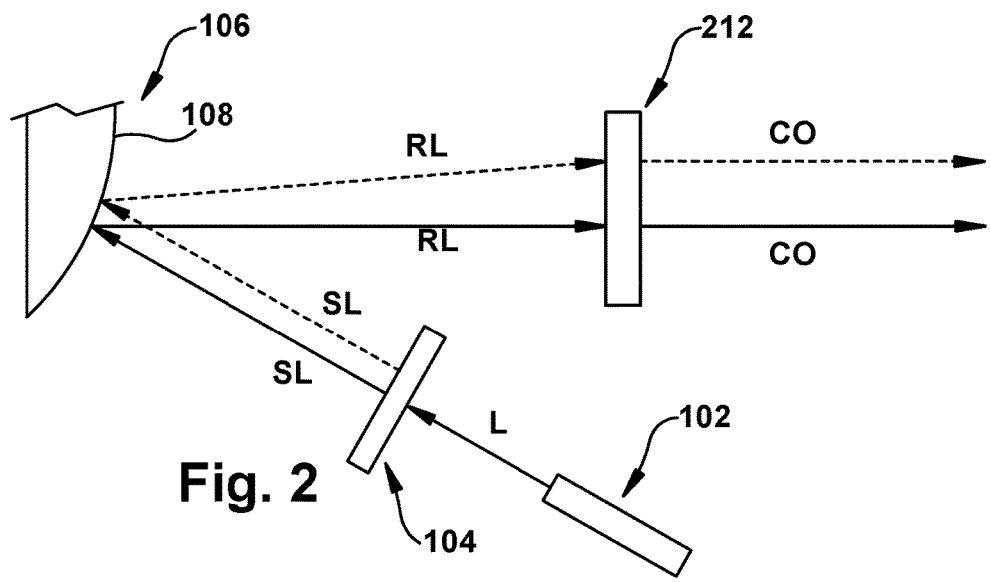
FIG. 2 is a schematic side view of the lidar system of FIG. 1.

A lidar system 100 constructed in accordance with the present invention is illustrated in FIGS. 1 and 2. The lidar system 100 includes a laser 102 configured to selectively emit a laser beam (shown schematically at "L") toward a beam steering device 104. The beam steering device 104 may have a fixed position relative to the laser 102 such that it does not move relative to the laser 102. The beam steering device 104 may be, for example, a liquid crystal grating.

The beam steering device 104 may include any desired number and type of polarization selectors, polarization gratings, diffraction gratings, phase gratings, liquid crystal gratings, and/or any other desired mechanism or structure capable of providing a desired emission/transmission angle to a laser beam entering it at a predetermined origination angle. As one example, nanosized liquid crystal droplets could be dispersed in a polymer matrix. A pixel-wall photomask is positioned in contact with a polymer-dispersed liquid crystal film during curing to control the rate of polymerization. The cured inhomogeneous composite film would then exhibit high transmittance and phase retardation between the high- and low-intensity regions. Such a film can be utilized as a diffraction grating that is polarization dependent and electrically tunable.

As another example, the beam steering device 104 may have a plurality of beam steering stages. A first beam steering stage may include a first polarization grating. The first polarization grating may have a first periodic uniaxial birefringence pattern and a polarization selector configured to provide a circularly polarized input beam incident on the first polarization grating. A second beam steering stage may be stacked on the first polarization grating opposite the polarization selector. The second beam steering stage may have a second polarization grating with a second periodic uniaxial birefringence pattern.

The first polarization grating and the first polarization selector, when present may be switched to provide a polarized input beam incident on the first polarization grating. The first polarization grating may alter a polarization of the input beam and alter a propagation angle thereof by a first angle to output a first beam. The second polarization grating may receive the first beam from the first beam steering stage. The second polarization grating may alter a polarization of the first beam and alter a propagation angle of the first beam by a second angle to output a second beam.

Regardless of type or mechanism of operation, however, the beam steering device 104 of the lidar system 100 steers beams emitted by the laser 102 (A.K.A., the emitted laser beam L) in at least a selected one of a plurality of available angles, to produce a steered laser beam ("SL", in the Figures). It is also contemplated that the beam steering device 104 could split or otherwise multiply a single laser beam L into a plurality of steered laser beams SL.

The lidar system 100 also includes a curved mirror 106 that reflects the steered beams at any desired angle or direction. The beam steering device 104 may steer beams L emitted by the laser at any desired angle or direction toward, for example, a curved or convex mirror. The beam steering device 104 may steer the beams L emitted by the laser up to 45 degrees to the left and up to 45 degrees to the right, so that the steered beams SL are steered over a 90 degree range toward the curved or convex mirror. This situation is shown in FIG. 1.

The curved mirror 106 could be curved in any desired orientation or plane and could be, for example, at least a portion of a cylinder. That is, certain "lines" across the surface of the curved mirror 106 are substantially equidistant from the plane ("P" in FIG. 1, extending into and out of the page) of the beam steering device 104.

As a further example, the curved mirror 106 could have a spherical profile—i.e., it is dome-shaped, with a flat bottom surface 108 (as shown in FIG. 1) and a top surface 110 which is a hemisphere or portion thereof, such that the top surface 110 is curved in three dimensions with respect to the beam steering device 104. That is, certain "circles" upon the surface of the curved mirror 106 are substantially equidistant from the plane P of the beam steering device 104.

As another example, a mirror 106 having a gridded or textured top surface 110 (e.g., an arrangement of many small rectangular or hexagonal planar surfaces) would be considered to be "curved", for the purpose of this description, as long as the general profile of the textured mirror 106 is a close approximation of a curve and any one plane is a very small minority of the total surface area. In any event, however, it is contemplated that the top surface 110 of the curved mirror 106 will be at least partially non-planar. The top surface 110 will also be configured to reflect laser 102 light therefrom, such as, but not limited to, by including a reflective coating and/or making at least part of the mirror 106 of reflective material. Any desired configuration for the curved mirror 106 can be provided, although for most use environments, the curved mirror 106 will be configured to reflect a steered laser beam SL at a predetermined trajectory responsive to the steered (by the beam steering device 104) angle of the laser beam L as originally produced by the laser 102. As a result, the curved mirror 106 produces a reflected laser beam ("RL", in the Figures) which can be used as a portion of a lidar system 100.

The curved mirror 106 may have a fixed position, and not move, relative to the laser 102 and/or to the beam steering device 104.

As shown in FIG. 2, the lidar system 100 may include a focusing lens 212 for collimating the reflected laser beam RL into a collimated output beam ("CO", in the Figures). This may be particularly helpful, for example, when the curved mirror 106 produces reflected laser beams RL which are dispersed in a nonparallel manner (such as due to the curvature of the mirror) and thus providing an extra degree of calculation difficulty for the lidar system 100. The collimated output beams CO would then be directed toward objects to be detected in the ambient area, in much the manner discussed below for the non-lens example embodiment of FIG. 1.

With reference back to FIG. 1, the lidar system 100 may also include a laser beam detector (shown schematically at 114 in the Figures) configured to detect a return signal ("CO", in the Figures) corresponding to an interaction between an ambient object 116 and the reflected laser beam RL. The detector 114 may be of any suitable type, and may be located as desired, whether adjacent to the other components of the lidar system 100 or remote, for a particular use environment. It is contemplated that multiple detectors 114 could be provided, depending upon the field of view intended for the lidar system 100 to encompass.

The lidar system 100 may also include a signal processor (shown schematically at 118 in the Figures) for receiving the return signal RS and responsively producing a lidar signal containing information about the ambient object 116. The signal processor 118 could be connected to any other component(s) of the lidar system 100 in any desired wired or wireless manner (shown schematically as W in the Figures) for signal transmission to or from those component(s). The lidar signal could be used in any desired manner, including as an input to a driver assist system.

Shown schematically as 120 in the Figures, a controller could be provided for directing the beam steering device 104 to the selected angle and processing the lidar signal responsively. To that end, the controller 120 could be connected to the signal processor 118, directly or through an intermediate component, in order to coordinate angles of the steered laser beam SL and reflected laser beam RL in order to provide meaningful lidar information.

The lidar system 100 shown in the various embodiments of this application has no moving parts since the laser 102, beam steering device 104, and mirror 106 do not move relative to each other. The mirror 106 reflects the steered beams SL at a desired trajectory. The mirror 106, in some embodiments, may reflect the steered beams SL up to 90 degrees to the left and up to 90 degrees to the right so that the reflected beams RL from the mirror 106 may be reflected over a 180 degree range. The beam steering device 104 and the curved mirror 106 thus provide a large field of view for the lidar system with a relatively simple device. As long as a controller 120, signal processor 118, and/or other calculation and/or processing component knows the trajectory at which the beam steering device 104 is transforming the laser beam L into a steered laser beam SL, the point at which the steered laser beam SL impinges upon the mirror 106 can be determined. As a result, the trajectory of the reflected beam RL is known, and therefore any return signal RS can be highly accurately correlated with a position, size, speed, or any other lidar-detectable property of an ambient object 116.

Figure 3:
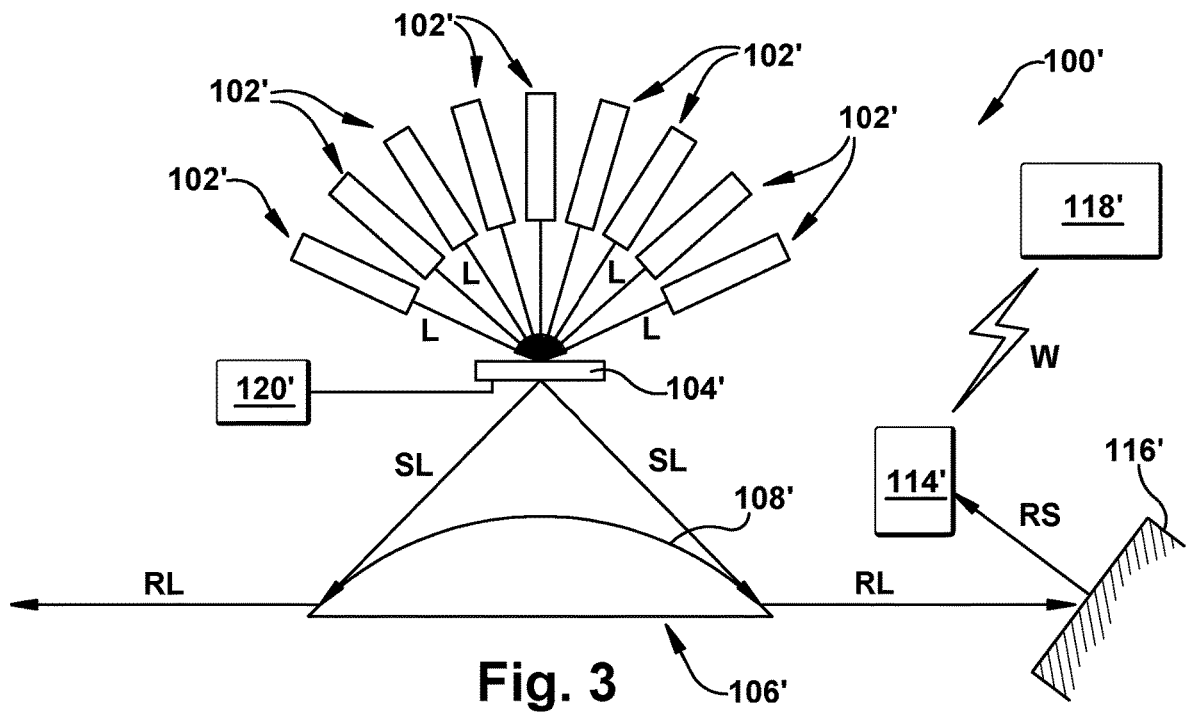
FIG. 3 is a schematic view of another embodiment of a lidar system constructed in accordance with the present invention.
Figure 4:
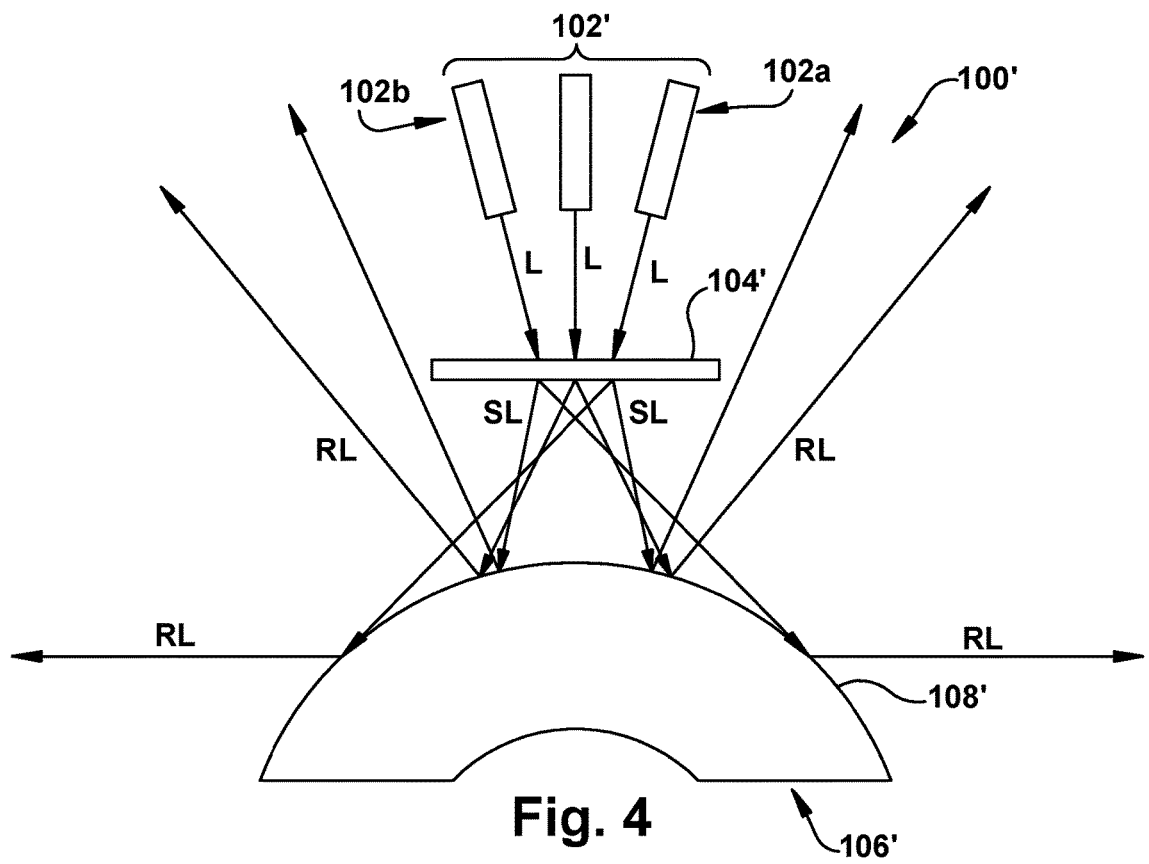
FIG. 4 is a schematic view of another configuration of the embodiment of FIG. 3.

FIGS. 3-4 illustrate a second embodiment of a lidar system 100'. The lidar system 100' of FIGS. 3-4 is similar to the lidar system 100 of FIGS. 1-2 and therefore, structures of FIGS. 3-4 that are the same as or similar to those described with reference to FIGS. 1-2 have the same reference numbers with the addition of a "prime" mark. Description of common elements and operation similar to those in the previously described first embodiment will not be repeated with respect to the second embodiment, but should instead be considered to be incorporated below by reference as appropriate.

The lidar system 100' shown in FIG. 3 includes a plurality of lasers 102' that each emit laser beams L toward a beam steering device 104'. The beam steering device 104' may be, for example, a liquid crystal polarization grating similar to one option for the beam steering device 104 of the first embodiment, shown in FIGS. 1-2. The beam steering device 104' of the second embodiment, shown in FIG. 3, has a fixed position relative to the lasers 102' and does not move relative to the lasers 102'.

The mirror 106' reflects the steered beams SL at any desired angle or direction. The mirror 106' may reflect the steered beams SL so that the reflected beams RL may be reflected over a 180 degree range. The beam steering device 104' and the curved mirror 106' provide a large field of view for the lidar system 100'. As shown in FIG. 3, the plurality of lasers 102' may collectively focus on a single input point to the beam steering device 104', in order, for example to provide a strong input laser beam L magnitude at that input point. Stated differently, each of the plurality of lasers 102' may emit a laser beam L toward a single location on the beam steering device 104'. As a result, the reflected laser beams RL of the second embodiment may be stronger than if a single laser 102' was used, thus potentially supporting a more powerful lidar system 100'.

Another aspect of the third embodiment of a lidar system 100' constructed in accordance with the present invention is shown in FIG. 4. The lidar system 100' of FIG. 4 includes a plurality of lasers 102' that emit laser beams L toward a beam steering device 104'. The beam steering device 104' shown in FIG. 4 may be, for example, a liquid crystal polarization grating similar to one option for the beam steering device 104 of the first embodiment, shown in FIGS. 1-2. The beam steering device 104' of the aspect of the second embodiment shown in FIG. 4 has a fixed position relative to the lasers 102' and does not move relative to the lasers 102'.

The beam steering device 102' of the second embodiment, as shown in FIG. 4 may steer beams L emitted by the lasers 102' at any desired angles or directions (i.e., trajectories) toward a curved or convex mirror 106', to create steered laser beams SL. The mirror 106' has a fixed position relative to the lasers 102' and the beam steering device 104', and does not move relative to the lasers 102' and the beam steering device 104'. The lidar system 100' of the second embodiment has no moving parts since the lasers 102', beam steering device 104', and mirror 106' do not move relative to each other.

As shown in FIG. 4, the lasers 102' may direct laser beams L to different locations of the liquid crystal polarization grating, or other operative structure, of the beam steering device 104'. A first laser 102a may shine on a first location of the beam steering device 104' and a second laser 102b may shine on a second location of the beam steering device 104', the second location being different from the first location. The pattern or other steering effectuator of the beam steering device 104' at the first location may be optimized for the first laser 102a and the pattern or other steering effectuator of the beam steering device 104' at the second location may be optimized for the second laser 102b. As shown in FIG. 4, any of the plurality of laser beams L directed to the beam steering device 104' may be split into multiple steered laser beams SL.

The beam steering device 104' of both aspects, shown in FIGS. 3 and 4, respectively, of the second embodiment may steer beams L emitted by each of the plurality of lasers 102' at any desired angles or directions (i.e., trajectories) toward a curved or convex mirror 106', to create steered laser beams SL. The mirror 106' has a fixed position relative to the lasers 102' and the beam steering device 104', and does not move relative to the lasers 102' and the beam steering device 104'. The lidar system 100' of the second embodiment has no moving parts since the lasers 102', beam steering device 104', and mirror 106' do not move relative to each other.

The lidar system 100, 100' of any embodiment of the present invention can be used to provide information about the location, travel speed, acceleration, shape, size, travel direction, and/or any other physical characteristics of an ambient object 116, 116'. In order to provide such information, the lidar system 100, 100' emits a laser beam L from the at least one laser 102, 102'. With the beam steering device 104, 104', the emitted laser beam L is steered at a selected one of a plurality of available angles to create a steered laser beam SL. The steered laser beam SL is reflected from the curved mirror 106, 106' at a predetermined trajectory responsive to the steered angle of the laser beam SL, to form a reflected laser beam RL. A return signal RS corresponding to an interaction between an ambient object 116, 116' and the reflected laser beam RL is detected. The return signal RS is received, and a lidar signal containing information about the ambient object is responsively produced.

When the beam steering device 104, 104' is directed to the selected angle, the lidar signal can be processed responsively, at least in part because the known trajectory of the reflected laser beam RL contains or embodies important information about the outgoing "ping" that is being used to detect the ambient object 116, 116'. The lidar signal can be used for any desired reason, such as, but not limited to, autonomous vehicle operation and/or a driver/operator assist system.

It is contemplated that the lidar system 100, 100' shown and described herein may be a solid state concept, meaning there are no moving mechanical parts. The beam steering device 104, 104' can be configured (e.g., be a diffraction grating) to be an element that facilitates elimination or reduction of the mechanical movement.

While aspects of this disclosure have been particularly shown and described with reference to the example aspects above, it will be understood by those of ordinary skill in the art that various additional aspects may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. In an effort to maintain clarity in the Figures, certain ones of duplicative components shown have not been specifically numbered, but one of ordinary skill in the art will realize, based upon the components that were numbered, the element numbers which should be associated with the unnumbered components; no differentiation between similar components is intended or implied solely by the presence or absence of an element number in the Figures. A "predetermined" status may be determined at any time before the structures being manipulated actually reach that status, the "predetermination" being made as late as immediately before the structure achieves the predetermined status. The term "substantially" is used herein to indicate a quality that is largely, but not necessarily wholly, that which is specified—a "substantial" quality admits of the potential for some relatively minor inclusion of a non-quality item. Though certain components described herein are shown as having specific geometric shapes, all structures of this disclosure may have any suitable shapes, sizes, configurations, relative relationships, cross-sectional areas, or any other physical characteristics as desirable for a particular application. Any structures or features described with reference to one aspect or configuration could be provided, singly or in combination with other structures or features, to any other aspect or configuration, as it would be impractical to describe each of the aspects and configurations discussed herein as having all of the options discussed with respect to all of the other aspects and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

We claim:

1. A light detection and ranging system comprising:
   at least one laser that emits a laser beam;
   a beam steering device that steers beams emitted by the laser at a desired angle, the beam steering device being a liquid crystal grating;
   a curved mirror that reflects the steered beams at any desired angle or direction.

2. The light detection and ranging system of claim 1, wherein the beam steering device has a fixed position relative to the laser.

3. The light detection and ranging system of claim 1, wherein the mirror has a fixed position relative to the laser.

4. The light detection and ranging system of claim 3, wherein the mirror has a fixed position relative to the beam steering device.

5. The light detection and ranging system of claim 1, wherein the at least one laser includes a plurality of lasers that each emits a laser beam toward the beam steering device, the beam steering device steering the laser beams emitted by the lasers at desired angles toward the curved mirror.

6. The light detection and ranging system of claim 5, wherein each of the plurality of lasers emits a laser beam toward a single location on the beam steering device.

7. The light detection and ranging system of claim 5, wherein the plurality of lasers includes a first laser that emits a laser beam toward a first location on the beam steering device, the plurality of lasers including a second laser that emits a laser beam toward a second location on the beam steering device, the second location being different than the first location.

8. The light detection and ranging system of claim 7 wherein a pattern on the beam steering device at the first location is optimized for the first laser and a pattern on the beam steering device at the second location is optimized for the second laser.

9. The light detection and ranging system of claim 1, wherein the mirror has a spherical profile.

10. A light detection and ranging system, comprising:
    at least one laser configured to selectively emit a laser beam;
    a beam steering device for steering the emitted laser beam at a selected one of a plurality of available angles, the beam steering device being a liquid crystal grating;
    a curved mirror that reflects the steered laser beam at a predetermined trajectory responsive to the steered angle of the laser beam;
    a laser beam detector configured to detect a return signal corresponding to an interaction between an ambient object and the reflected laser beam; and
    a signal processor for receiving the return signal and responsively producing a lidar signal containing information about the ambient object.

11. The light detection and ranging system of claim 10, including a controller for directing the beam steering device to the selected angle and processing the lidar signal responsively.

12. The light detection and ranging system of claim 10, wherein the beam steering device has a fixed position relative to the laser.

13. The light detection and ranging system of claim 10, wherein the mirror has a fixed position relative to the laser.

14. The light detection and ranging system of claim 13, wherein the mirror has a fixed position relative to the beam steering device.

15. The light detection and ranging system of claim 10, wherein the at least one laser includes a plurality of lasers that each emits a laser beam toward the beam steering device, the beam steering device steering the laser beams emitted by the lasers at selected ones of a plurality of available angles toward the curved mirror.

16. The light detection and ranging system of claim 15, wherein each of the plurality of lasers emits a laser beam toward a single location on the beam steering device.

17. The light detection and ranging system of claim 15, wherein the plurality of lasers includes a first laser that emits a laser beam toward a first location on the beam steering device, the plurality of lasers including a second laser that emits a laser beam toward a second location on the beam steering device, the second location being different than the first location.

18. The light detection and ranging system of claim 10, wherein the mirror has a spherical profile.

19. The light detection and ranging system of claim 10, including a focusing lens for collimating the reflected laser beam into a collimated output beam.

20. A method of providing a light detection and ranging system, the method comprising:

providing a system including a plurality of lasers, a beam steering device, and a curved mirror;

emitting a plurality of laser beams from two or more of the plurality of lasers toward a single location on the beam steering device;

with the beam steering device, steering each of the emitted laser beams emitted by the lasers at a desired angle toward the curved mirror;

reflecting the steered laser beam from the curved mirror at a predetermined trajectory responsive to the steered angle of the laser beam;

detecting a return signal corresponding to an interaction between an ambient object and the reflected laser beam; and receiving the return signal and responsively producing a lidar signal containing information about the ambient object.

21. The method of claim 20, including directing the beam steering device to the selected angle and processing the lidar signal responsively.

22. A light detection and ranging system comprising:

a plurality of lasers that each emits a laser beam toward a single location on a beam steering device;

the beam steering device that steers the laser beams emitted by the lasers at desired angles toward a curved mirror;

the curved mirror that reflects the steered beams at any desired angle or direction.

23. A light detection and ranging system, comprising:

a plurality of lasers that each emits a laser beam toward a single location on a beam steering device;

the beam steering device steering the laser beams emitted by the lasers at selected ones of a plurality of available angles toward a curved mirror;

the curved mirror that reflects the steered laser beams at predetermined trajectories responsive to the steered angles of the laser beams;

a laser beam detector configured to detect a return signal corresponding to an interaction between an ambient object and the reflected laser beams; and a signal processor for receiving the return signal and responsively producing a lidar signal containing information about the ambient object.

* * * * *